(12) United States Patent
Choi et al.

(10) Patent No.: US 8,169,557 B2
(45) Date of Patent: May 1, 2012

(54) DISPLAY SUBSTRATE FOR LIQUID CRYSTAL DISPLAY PANEL

(75) Inventors: Jin-Young Choi, Seoul (KR); Jin Jeon, Gyeoggi-do (KR)

(73) Assignee: Samsung Electronics Co., Ltd. (KR)

( * ) Notice: Subject to any disclaimer, the term of this patent is extended or adjusted under 35 U.S.C. 154(b) by 1206 days.

(21) Appl. No.: 11/538,374

(22) Filed: Oct. 3, 2006

(65) Prior Publication Data

US 2007/0097280 A1 May 3, 2007

(30) Foreign Application Priority Data

Nov. 3, 2005 (KR) .................. 10-2005-0104666

(51) Int. Cl.
*G02F 1/1343* (2006.01)

(52) U.S. Cl. ........... 349/38; 349/144; 349/145; 349/146

(58) Field of Classification Search .............. 349/38–39, 349/142–146
See application file for complete search history.

(56) References Cited

U.S. PATENT DOCUMENTS

| | | | | | |
|---|---|---|---|---|---|
| 5,822,027 | A | * | 10/1998 | Shimada et al. | 349/39 |
| 6,300,987 | B1 | * | 10/2001 | Jung | 349/39 |
| 7,450,202 | B2 | * | 11/2008 | Tsuchiya | 349/114 |
| 2003/0107696 | A1 | * | 6/2003 | Song | 349/141 |

FOREIGN PATENT DOCUMENTS

| | | |
|---|---|---|
| CN | 1615450 A | 5/2005 |
| KR | 10-0271454 B1 | 11/2000 |
| KR | 1020030046918 A | 6/2003 |

* cited by examiner

*Primary Examiner* — Mark Robinson
*Assistant Examiner* — Charles Chang
(74) *Attorney, Agent, or Firm* — Innovation Counsel LLP (57) ABSTRACT

A display substrate includes a first pixel part including a first switching element, a second pixel part including a second switching element, a third pixel part including a third switching element, a first pixel electrode, a second pixel electrode and a third pixel electrode. The third pixel part is adjacent to the first pixel part. The first pixel electrode is electrically connected to the first switching element, and is formed on the first and second pixel part. The second pixel electrode is electrically connected to the second switching element, and is formed on a portion of the second pixel part. The third pixel electrode is electrically connected to the third switching element, and is formed on the first and third pixel parts. Therefore, an opening ratio is increased, thereby improving an image display quality.

19 Claims, 11 Drawing Sheets

DISPLAY SUBSTRATE FOR LIQUID CRYSTAL DISPLAY PANEL

CROSS-REFERENCE TO RELATED APPLICATIONS

The present application claims priority from Korean Patent Application No. 2005-104666, filed on Nov. 3, 2005, the disclosure of which is hereby incorporated herein by reference.

FIELD OF THE INVENTION

The present invention relates to a display substrate for a liquid crystal display having an improved opening ratio.

DESCRIPTION OF THE RELATED ART

A LCD panel, in general, includes a display substrate, an opposite substrate and a liquid crystal layer. The display substrate includes a plurality of thin film transistors (TFTs) that function as switching elements to drive a plurality of pixels. The opposite substrate includes a common electrode. The liquid crystal layer is interposed between the display substrate and the opposite substrate. The light transmittance of the liquid crystals varies in response to the applied electric field thereby displaying an image.

There are two types of LCD displays. The vertical alignment (VA) mode LCD panel and the patterned vertical alignment (PVA) mode. In the VA mode LCD, the liquid crystals are aligned in a vertical direction in the absence of an applied electic field to display black. In the PVA mode, the common electrode and pixel electrodes are patterned to define a plurality of domains, thereby increasing the viewing angle of the LCD panel.

The PVA mode LCD includes a black matrix formed on the opposite substrate to block light that leaks through an opening of each of the pixel electrodes of the display substrate. In order to compensate for misalignment between the display substrate and the black matrix, the size of the black matrix is increased. However, when the size of the black matrix is increased, the opening ratio of the pixels is decreased.

SUMMARY OF THE INVENTION

The present invention provides a display substrate having an improved opening ratio. A display substrate in accordance with one aspect of the present invention includes a first pixel part, a second pixel part, a third pixel part, a first pixel electrode, a second pixel electrode and a third pixel electrode. The first pixel part includes a first switching element electrically connected to an n-th gate line and an m-th source line. The second pixel part includes a second switching element electrically connected to an (n−1)-th gate line and the m-th source line, the second pixel part being adjacent to the first pixel part. The third pixel part includes a third switching element electrically connected to an (n+1)-th gate line and the m-th source line. The third pixel part is adjacent to the first pixel part. The first pixel electrode electrically is connected to the first switching element, and is formed on the first and second pixel part. The second pixel electrode is electrically connected to the second switching element, and is formed on a portion of the second pixel part. The third pixel electrode is electrically connected to the third switching element, and is formed on the first and third pixel parts.

An LCD panel in accordance with another aspect of the present invention includes a display substrate and an opposite substrate. The display substrate includes a first pixel part, a second pixel part, a third pixel part, a first pixel electrode, a second pixel electrode and a third pixel electrode. The first pixel part includes a first switching element electrically connected to an n-th gate line and an m-th source line. The second pixel part includes a second switching element electrically connected to an (n−1)-th gate line and the m-th source line. The third pixel part includes a third switching element electrically connected to an (n+1)-th gate line and the m-th source line. The first pixel electrode is electrically connected to the first switching element, and is formed on the first and second pixel part. The second pixel electrode is electrically connected to the second switching element, and is formed on a portion of the second pixel part. The third pixel electrode is electrically connected to the third switching element, and is formed on the first and third pixel parts. The opposite substrate is combined with the display substrate to interpose a liquid crystal layer, and includes a black matrix corresponding to the source lines.

An LCD device in accordance with still another aspect of the present invention includes an LCD panel and a liquid source module. The LCD panel includes a first pixel part, a second pixel part, a third pixel part, a first pixel electrode, a second pixel electrode and a third pixel electrode. The first pixel part includes a first switching element electrically connected to an n-th gate line and an m-th source line. The second pixel part includes a second switching element electrically connected to an (n−1)-th gate line and the m-th source line. The third pixel part includes a third switching element electrically connected to an (n+1)-th gate line and the m-th source line. The first pixel electrode is electrically connected to the first switching element, and is formed on the first and second pixel part. The second pixel electrode is electrically connected to the second switching element, and is formed on a portion of the second pixel part. The third pixel electrode is electrically connected to the third switching element, and is formed on the first and third pixel parts. The light source module supplies the LCD panel with light.

A liquid crystal color display in accordance with still another aspect of the present invention includes a plurality of pixels, pixel electrodes and thin film transistors for driving said pixels. Each of said pixels includes a respective pixel part, pixel electrode and thin film transistor for each of said colors. A first of said pixel electrodes is formed partially on a first and on a second of said pixel parts. A second of said pixel electrodes is formed partially on said second pixel part and on a third of said pixel parts. A third pixel electrode is formed partially on said third pixel part and an adjoining one of said pixel parts.

The display substrate includes an array substrate, a color filter on array (COA) substrate, a black matrix on array (BOA) substrate, an organic light emitting display (OLED) substrate, etc. According to the present invention, the opening ratio of the pixel is increased so that an image display quality of the LCD device is improved. The opening ratio is a ratio of an effective display area to a total display area of a display panel. Light may pass through the effective display area to display image.

BRIEF DESCRIPTION OF THE DRAWINGS

The above and other objects and features of the present invention will become more apparent from a reading of the ensuing description together with the drawing, in which.

DESCRIPTION OF THE EMBODIMENTS

The invention is described more fully hereinafter with reference to the accompanying drawings, in which embodiments of the invention are shown. In the drawings, the size and relative sizes of layers and regions may be exaggerated for clarity. It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. It will be understood that terms such as first, second, third etc. are used herein for convenience to distinguish one element, component, region, layer or section from another region, layer or section illustrative elements, components, regions, layers and/or sections and not as words of limitation. Spatially relative terms, such as "beneath," "below," "lower," "above," "upper" and the like, may be used herein for ease of description to describe one element or feature's relationship to another element(s) or feature(s) and are intended to encompass different orientations of the device in use or operation in addition to the orientation depicted in the figures. Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Figure 1:
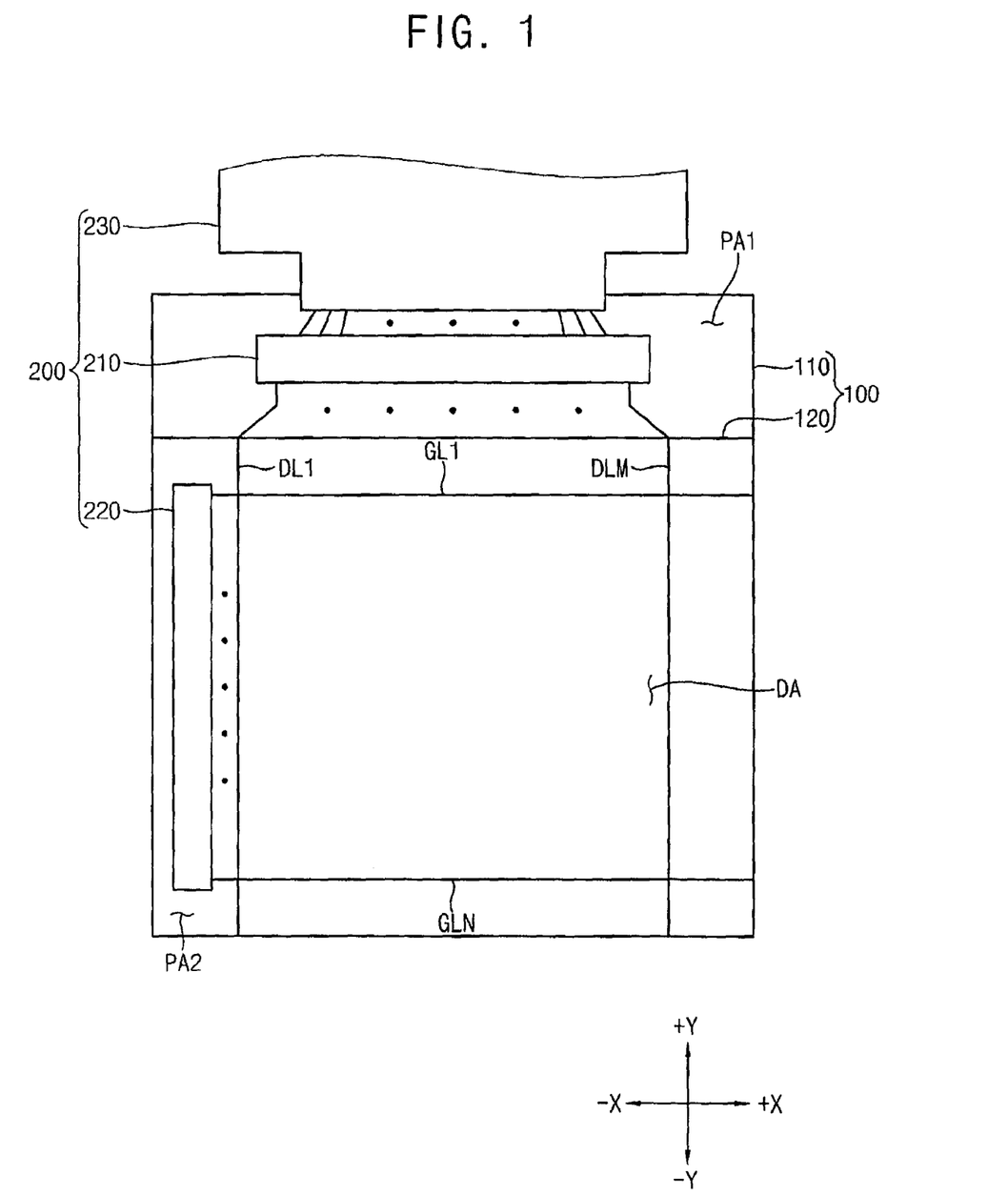
FIG. 1 is a plan view illustrating a liquid crystal display (LCD) device in accordance with one embodiment of the present invention.
Figure 2:
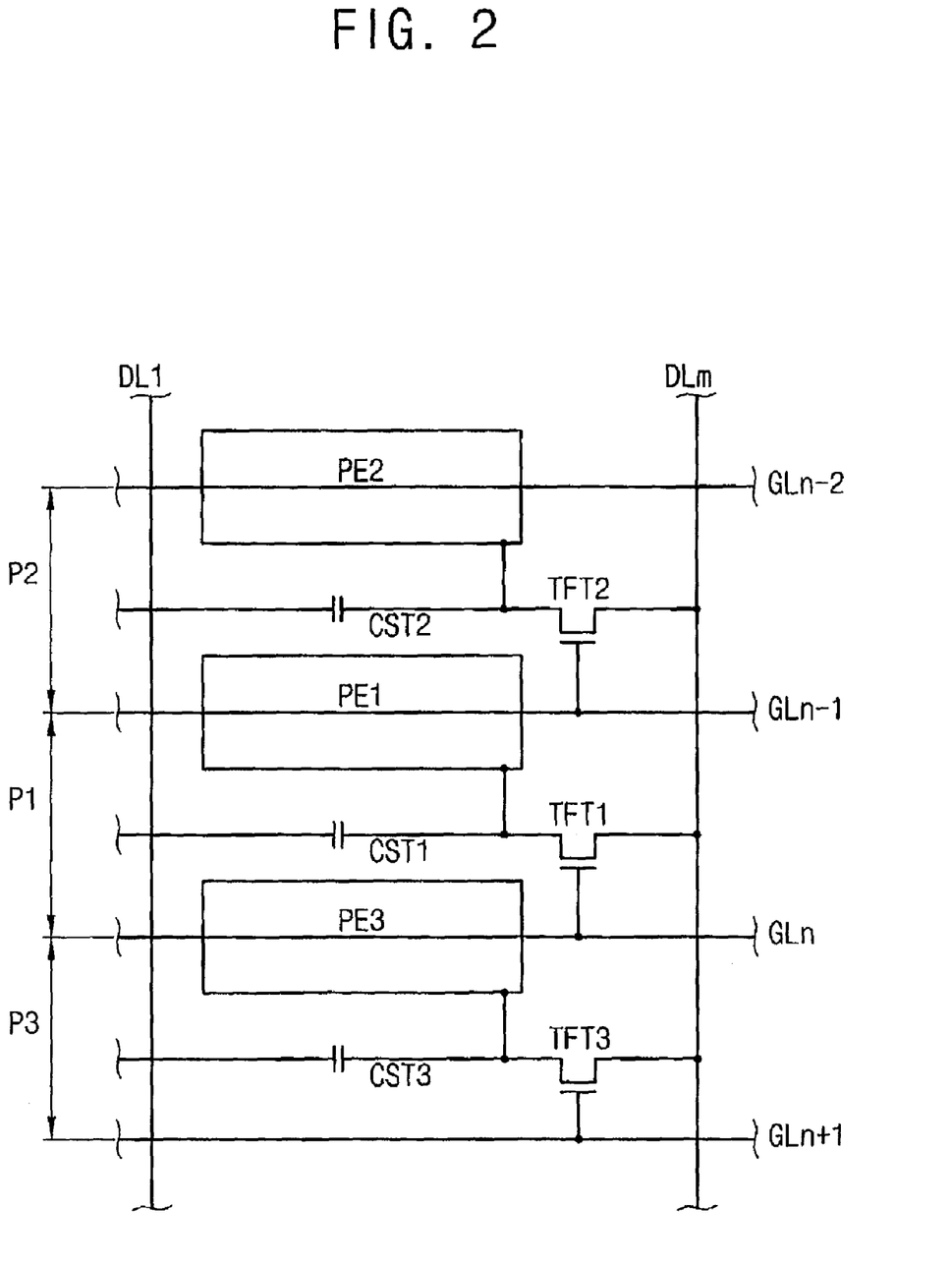
FIG. 2 is a circuit diagram illustrating a pixel of an LCD panel shown in FIG. 1.
Figure 3:
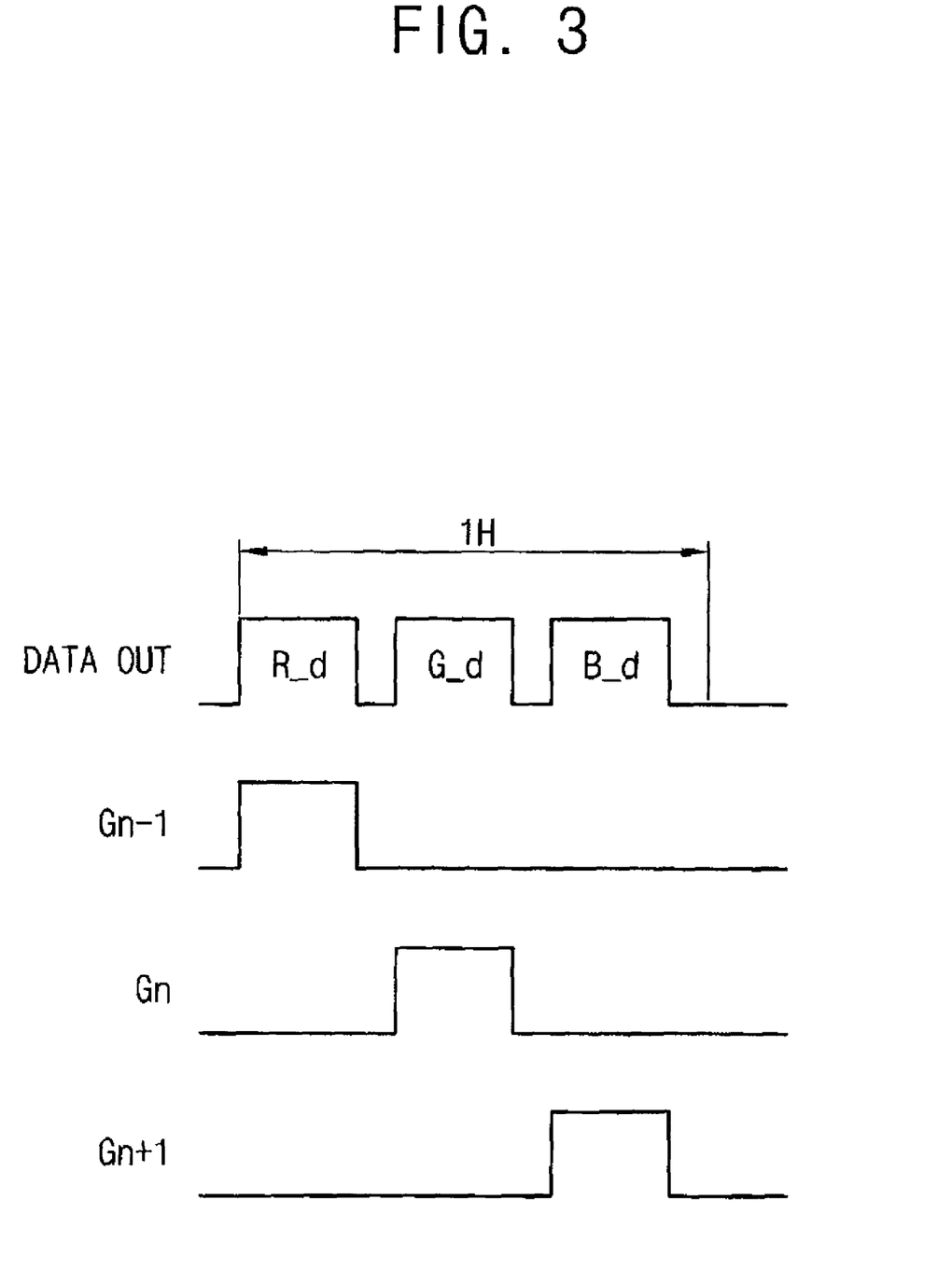
FIG. 3 is a timing diagram illustrating operation of the LCD panel shown in FIG. 1.

Referring to FIGS. 1 to 3, the LCD device includes the LCD panel 100 and a driving unit 200 that drives the LCD panel 100. The LCD panel 100 includes a display substrate 110, an opposite substrate 120 and a liquid crystal layer (not shown). The liquid crystal layer is interposed between the display substrate 110 and the opposite substrate 120. The display substrate 110 includes a display region DA, a first peripheral region PA1 and a second peripheral region PA2.

A plurality of gate lines GL1, . . . GLN and a plurality of source lines DL1, . . . DLM are formed in the display region DA. The gate lines GL1, . . . GLN are extended in a first direction X. The source lines DL1, . . . DLM are extended in a second direction Y that crosses the first direction X. A plurality of pixel parts P1, P2 and P3 are defined by the source and gate lines GL1, . . . GLN, DL1, . . . DLM. A plurality of switching elements TFT1, TFT2 and TFT3 are formed on the pixel parts P1, P2 and P3, respectively. A plurality of pixel electrodes PE1, PE2 and PE3 are electrically connected to the switching elements TFT1, TFT2 and TFT3, respectively.

Particularly, a first switching element TFT1 is formed on a first pixel part P1. The first switching element TFT1 is electrically connected to an m-th source line DLm and an n-th gate line GLn. In addition, the first switching element TFT1 is electrically connected to a first pixel electrode PE1 and a first storage capacitor CST1.

The first pixel electrode PE1 is formed on the first pixel part P1 and a second pixel part P2 that is adjacent to the first pixel part P1 in the second direction Y. The first pixel electrode PE1 and a common electrode of the opposite substrate 120 form a first liquid crystal capacitor CST1.

A second switching element TFT2 is formed on the second pixel part P2. The second switching element TFT2 is electrically connected to the m-th source line DLm and an (n−1)-th gate line GLn−1. In addition, the second switching element TFT2 is electrically connected to a second pixel electrode PE2 and a second storage capacitor SCT2.

The second pixel electrode PE2 is formed on the second pixel part P2 and a pixel part that is adjacent to the second pixel part P2 in the second direction Y. The second pixel electrode PE2 and the common electrode of the opposite substrate 120 form a second liquid crystal capacitor CST2.

A third switching element TFT3 is formed on the third pixel part P3. The third switching element TFT3 is electrically connected to the m-th source line DLm and an (n+1)-th gate line GLn+1. In addition, the third switching element TFT3 is electrically connected to a third pixel electrode PE3 and a third storage capacitor SCT3.

The third pixel electrode PE3 is formed on the third pixel part P3 and the first pixel part P1 that is adjacent to the third pixel part P3 in the second direction Y. The third pixel electrode PE3 and the common electrode of the opposite substrate 120 form a third liquid crystal capacitor CST3.

The driving unit 200 includes a source driving part 210 and a gate driving part 230. The source driving part 210 may be a single chip mounted on the first peripheral region PA1. The source driving part 210 applies a plurality of data signals to the source lines DL1, . . . DLM based on data signals and control signals that are from externally provided to the LCD panel 100 through a flexible printed circuit board 230. In FIG. 3, the source driving part 210 applies red, green and blue data signals R_d, G_d and B_d to the source lines DL1, . . . DLM. The red, green and blue data signals R_d, G_d and B_d are shown on the top line of FIG. 3 as DATA_OUT. The gate driving part 220 may be integrated on the second peripheral region PA2 to apply a plurality of gate signals to the gate lines GL1, . . . GLN.

Referring to FIGS. 2 and 3, the gate driving part 220 outputs three gate signals during 1 H period. In particular, when the red data signal R_d is applied to the source lines DLm−1 and DLm, the gate driving part 220 applies an (n−1)-th gate signal to an (n−1)-th gate line GLn−1. When the green data signal G_-d is applied to the source lines DLm−1 and DLm, the gate driving part 220 applies an n-th gate signal to an n-th gate line GLn. When the blue data signal B_-d is applied to the source lines DLm−1 and DLm, the gate driving part 220 applies an (n+1)-th gate signal to an (n+1)-th gate line GLn+1.

Figure 4:
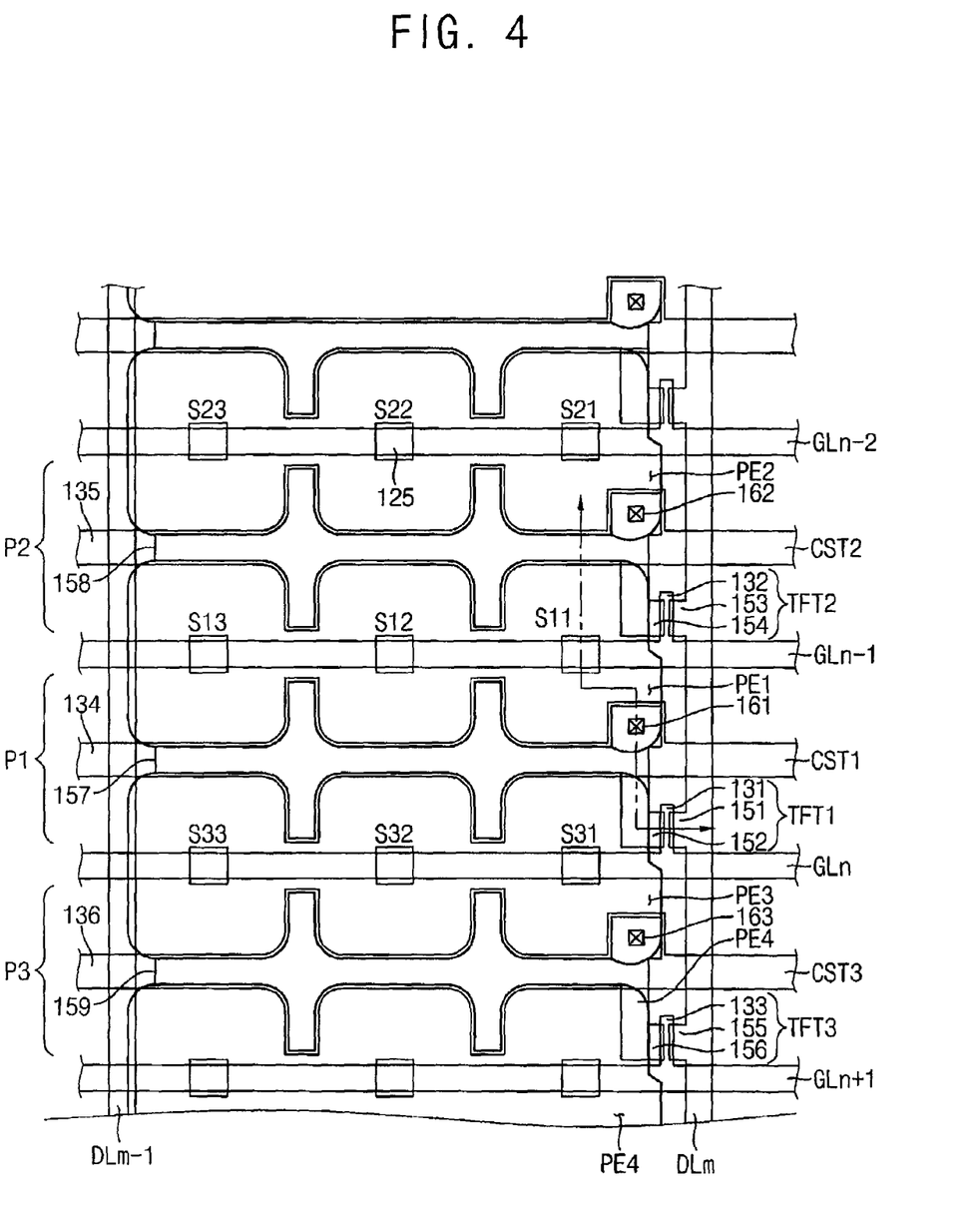
FIG. 4 is a plan view illustrating the LCD panel in accordance with another embodiment of the present invention.
Figure 5:
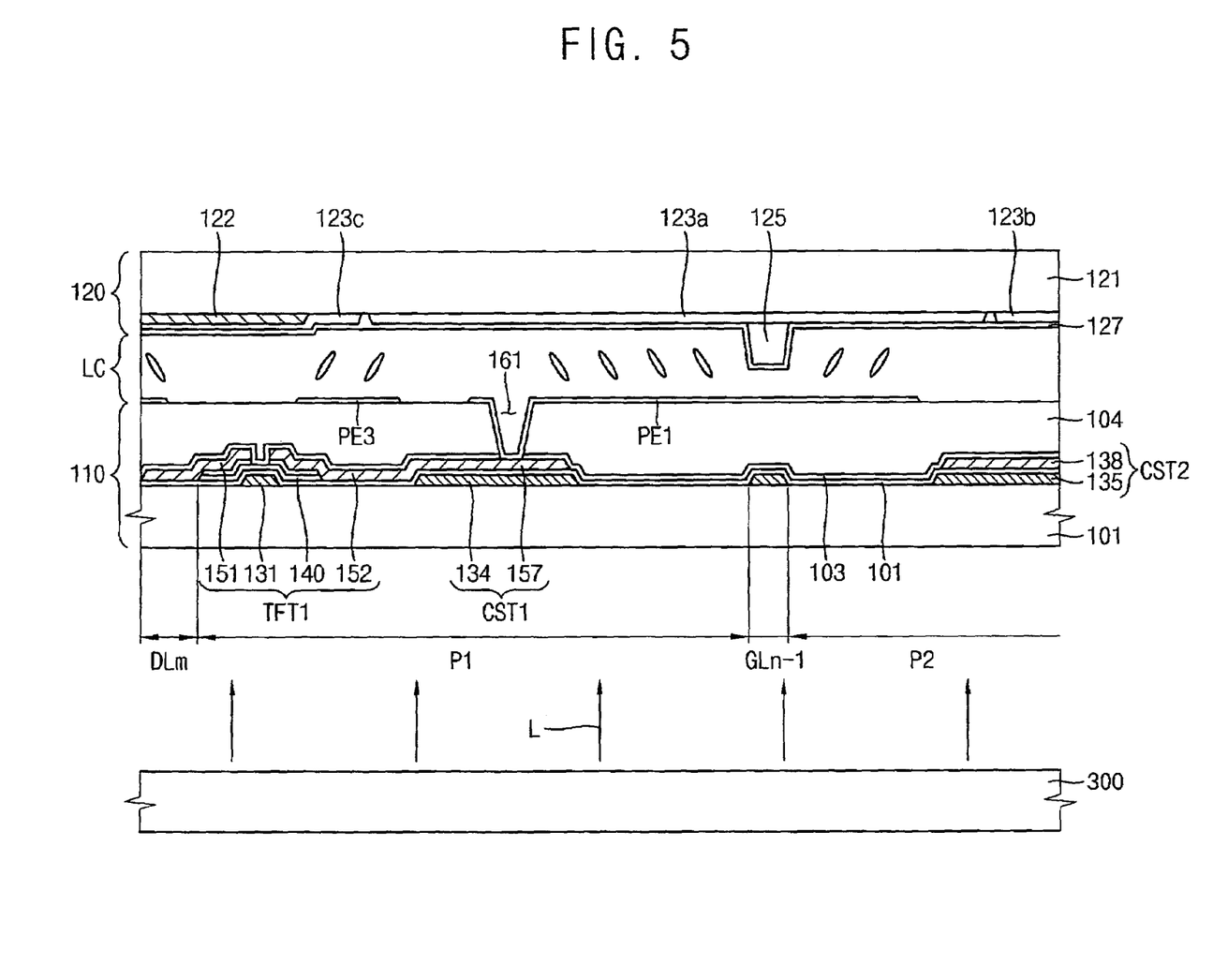
FIG. 5 is a cross-sectional view taken along a line I-I' shown in FIG. 4.

Referring to FIGS. 4 and 5, an LCD device includes the LCD panel 300 and a light source module 400. The light source module 400 supplies the LCD panel 300 with a light L. The LCD panel 300 includes a display substrate 110, an opposite substrate 120 and a liquid crystal layer LC. The opposite substrate 120 faces the display substrate 110. The liquid crystal layer LC is interposed between the display substrate 110 and the opposite substrate 120.

The display substrate 110 includes a first base substrate 101, a plurality of gate lines GLn−2, . . . GLn+1, a plurality of source lines DLm−1 and DLm and first, second and third pixel parts P1, P2 and P3. The first, second and third pixel parts P1, P2 and P3 are defined by the gate and source lines GLn−1, . . . GLn+1, DLm−1 and DLm.

A first switching element TFT1 and a first storage capacitor CST1 are formed on the first pixel part P1. The first switching element TFT1 is electrically connected to a first pixel electrode PE1 and the first storage capacitor CST1.

The first switching element TFT1 includes a first gate electrode 131, a first source electrode 151 and a first drain electrode 152. The first gate electrode 131 is electrically connected to an n-th gate line GLn. The first source electrode 151 is electrically connected to an m-th source line DLm. The first drain electrode 152 is electrically connected to the first pixel electrode PE1 through a first contact hole 161. A semiconductor layer is formed between the first source electrode 151 and the first drain electrode 152 on the first gate electrode 131. The semiconductor layer includes an active layer 141 and an N+ amorphous silicon layer 142. A passivation layer 103 and an organic insulating layer 104 are formed between the first switching element TFT1 and the first pixel electrode PE1.

For example, the first switching element TFT1 and the first contact hole 161 are formed on a peripheral portion of the first pixel part P1. That is, the first switching element TFT1 and the first contact hole 161 are formed on the peripheral portion of the first pixel part P1 on which an electric field is not uniformly formed. Thus, the opening ratio of the first pixel part P1 may be increased.

A second switching element TFT2 and a second storage capacitor CST2 are formed on the second pixel part P2. The second switching element TFT2 is electrically connected to a second pixel electrode PE2 and the second storage capacitor CST2.

The second switching element TFT2 includes a second gate electrode 132, a second source electrode 153 and a second drain electrode 154. The second gate electrode 132 is electrically connected to an (n−1)-th gate line GLn−1. The second source electrode 153 is electrically connected to the m-th source line DLm. The second drain electrode 154 is electrically connected to the second pixel electrode PE2 through a second contact hole 162. A semiconductor layer (not shown) is formed between the second source electrode 153 and the second drain electrode 154 on the second gate electrode 132. The passivation layer 103 and the organic insulating layer 104 are formed between the second switching element TFT2 and the second pixel electrode PE2.

For example, the second switching element TFT2 and the second contact hole 162 are formed on a peripheral portion of the second pixel part P2. That is, the second switching element TFT2 and the second contact hole 162 are formed on the peripheral portion of the second pixel part P2 on which an electric field is not uniformly formed. Thus, an opening ratio of the second pixel part P2 may be increased.

A third switching element TFT3 and a third storage capacitor CST3 are formed on the third pixel part P3. The third switching element TFT3 is electrically connected to a third pixel electrode PE3 and the third storage capacitor CST3.

The third switching element TFT3 includes a third gate electrode 133, a third source electrode 155 and a third drain electrode 156. The third gate electrode 133 is electrically connected to an (n+1)-th gate line GLn+1. The third source electrode 155 is electrically connected to the m-th source line DLm. The third drain electrode 156 is electrically connected to the third pixel electrode PE3 through a third contact hole 163. A semiconductor layer (not shown) is formed between the third source electrode 155 and the third drain electrode 156 on the third gate electrode 133. The passivation layer 103 and the organic insulating layer 104 are formed between the third switching element TFT3 and the third pixel electrode PE3.

For example, the third switching element TFT3 and the third contact hole 163 are formed on a peripheral portion of the third pixel part P3. That is, the third switching element TFT3 and the third contact hole 163 are formed on the peripheral portion of the third pixel part P3 on which an electric field is not uniformly formed. Thus, an opening ratio of the third pixel part P3 may be increased.

The first pixel electrode PE1 is formed on the first pixel part P1 and the second pixel part P2 that is adjacent to the first pixel part P1. The first pixel electrode PE1 is partially overlapped with the (m−1)-th source line DLm−1. Thus, the opening ratio of the first pixel part P1 may be increased.

In FIGS. 4 and 5, the first pixel electrode PE1 includes a first sub electrode S11, a second sub electrode S12 and a third sub electrode S13. Liquid crystals of the liquid crystal layer LC vary arrangement in response to an electric field applied to the liquid crystals between the first, second and third sub electrodes S11, S12 and S13 and the common electrode 127 of the opposite substrate 120. The liquid crystals on the first, second and third sub electrodes S11, S12 and S13 of the first pixel electrode PE1 may be arranged in various directions so that the viewing angle of the display panel is increased.

The second pixel electrode PE2 is formed on the second pixel part P2 and a pixel part that is adjacent to the second pixel part P2. The second pixel electrode PE2 is partially overlapped with the (m−1)-th source line DLm−1. Thus, the opening ratio of the second pixel part P2 may be increased. The second pixel electrode PE2 may include a first sub electrode S21, a second sub electrode S22 and a third sub electrode S23. The liquid crystals on the first, second and third sub electrodes S21, S22 and S23 of the second pixel electrode PE2 may be arranged in various directions so that the viewing angle of the display panel is increased.

The third pixel electrode PE3 is formed on the third pixel part P3 and the first pixel part P1 that is adjacent to the third pixel part P3. The third pixel electrode PE3 is partially overlapped with the (m−1)-th source line DLm−1. Thus, the opening ratio of the third pixel part P3 may be increased. The third pixel electrode PE3 may include a first sub electrode S31, a second sub electrode S32 and a third sub electrode S33. The liquid crystals on the first, second and third sub electrodes S31, S32 and S33 of the third pixel electrode PE3 may be arranged in various directions so that the viewing angle of the display panel is increased.

The first storage capacitor CST1 includes a first common line 134, a first metal electrode 157 and a gate insulating layer interposed between the first common line 134 and the first metal electrode 157.

The first common line 134 is formed on a portion of the first pixel part P1 between the first and third pixel electrodes PE1 and PE3. That is, the first common line 134 is formed on the first pixel part P1 except the first and third pixel electrodes PE1 and PE3. The first common line 134 blocks light generated from the light source module 300. The first common line 134 functions as a first electrode of the first storage capacitor CST1. In particular, the first common line 134 is disposed on a region between the first and third pixel electrodes PE1 and PE3 and a region between sub electrodes of each of the first and third pixel electrodes PE1 and PE3.

The first metal electrode 157 is extended from the first drain electrode 152, and is electrically connected to the first pixel electrode PE1. The first metal electrode 157 is overlapped with the first common line 134, and functions as a second electrode of the first storage capacitor CST1.

The second storage capacitor CST2 includes a second common line 135, a second metal electrode 158 and a gate insulating layer interposed between the second common line 135 and the second metal electrode 158.

The second common line 135 is formed on a portion of the second pixel part P2 between the first and second pixel electrodes PE1 and PE2. That is, the second common line 135 is formed on the second pixel part P2 except the first and second pixel electrodes PE1 and PE2. The second common line 135 blocks light generated from the light source module 300. The second common line 135 functions as a first electrode of the second storage capacitor CST2. In particular, the second common line 135 is disposed on a region between the first and second pixel electrodes PE1 and PE2 and a region between sub electrodes of each of the first and second pixel electrodes PE1 and PE2.

The second metal electrode 158 is extended from the second drain electrode 154, and is electrically connected to the second pixel electrode PE2. The second metal electrode 158 is overlapped with the second common line 135, and functions as a second electrode of the second storage capacitor CST2.

The third storage capacitor CST3 includes a third common line 136, a third metal electrode 159 and the gate insulating layer interposed between the third common line 136 and the third metal electrode 159.

The third common line 136 is formed on a portion of the third pixel part P3 between the third and fourth pixel electrodes PE3 and PE4. That is, the third common line 136 is formed on the third pixel part P3 except the third and fourth pixel electrodes PE3 and PE4. The third common line 136 blocks light generated from the light source module 300. The third common line 136 functions as a first electrode of the third storage capacitor CST3. In particular, the third common line 136 is disposed on a region between the third and fourth pixel electrodes PE3 and PE4 and a region between sub electrodes of each of the third and fourth pixel electrodes PE3 and PE4.

The third metal electrode 159 is extended from the third drain electrode 156, and is electrically connected to the third pixel electrode PE3. The third metal electrode 159 is overlapped with the third common line 136, and functions as a second electrode of the third storage capacitor CST3.

The opposite substrate 120 includes a second base substrate 201, a black matrix 122, a plurality of color filter patterns 123a, 123b and 123c, a plurality of protruded patterns 125 and a common electrode 127. The black matrix 122, the color filter patterns 123a, 123b and 123c, the protruded patterns 125 and the common electrode 127 are formed on the second base substrate 201.

The black matrix 122 corresponds to the source lines DLm−1 and DLm, and is not formed on a region corresponding to the gate lines GLn−2, GLn−1, GLn and GLn+1 and the pixel electrodes PE1, PE2, PE3 and PE4.

Particularly, the storage capacitors CST1, CST2 and CST3 are formed between the pixel electrodes PE1, PE2 and PE3 and between the sub electrodes S1$k$, S2$k$ and S3$k$ of the pixel electrodes PE$k$, wherein k is one, two or three. That is, the storage capacitors CST1, CST2 and CST3 are formed between the pixel electrodes PE1, PE2 and PE3 and between the sub electrodes S1 $k$, S2$k$ and S3$k$ of the pixel electrodes PE$k$, so that the light incident into the space on which the pixel electrodes PE1, PE2 and PE3 is blocked. The storage capacitors CST1, CST2 and CST3 may also function as the black matrix 122.

Therefore, the storage capacitors CST1, CST2 and CST3 block the light incident into the space between the pixel electrodes PE1, PE2 and PE3 and between the sub electrodes S1$k$, S2$k$ and S3$k$ of the pixel electrodes PE$k$ so that the black matrix 122 may not be formed between the pixel electrodes PE1, PE2 and PE3 and between the sub electrodes S1$k$, S2$k$ and S3$k$ of the pixel electrodes PE$k$. When the black matrix 122 covers the space between the pixel electrodes PE1, PE2 and PE3 and between the sub electrodes S1$k$, S2$k$ and S3$k$ of the pixel electrodes PE$k$, the black matrix 122 may have a greater width than the space between the pixel electrodes PE1, PE2 and PE3 and between the sub electrodes S1$k$, S2$k$ and S3$k$ of the pixel electrodes PE$k$ so that the opening ratio is decreased. However, in FIGS. 4 and 5, the black matrix 122 corresponding to the space between the pixel electrodes PE1, PE2 and PE3 and between the sub electrodes S1$k$, S2$k$ and S3$k$ of the pixel electrodes PE$k$ is omitted so that the opening ratio is increased.

The color filter patterns 123a, 123b and 123c correspond to the pixel electrodes PE1, PE2 and PE3, respectively, and include red, green and blue color filter patterns.

Particularly, the green color filter pattern 123a corresponds to the first pixel electrode PE1. The red color filter pattern 123b corresponds to the second pixel electrode PE2. The blue color filter pattern 123c corresponds to the third pixel electrode PE3.

The protruded patterns 125 correspond to centers of the sub electrodes of the pixel electrodes PE1, PE2 and PE3, respectively. For example, the protruded patterns 125 are formed on centers of the first, second and third sub electrodes S11, S12 and S13 of the first pixel electrode PE1, respectively. That is, the protruded patterns 125 are on the n-th gate line GLn.

The common electrode 127 is formed on the second base substrate 121 having the protruded patterns 125. Liquid crystals of the liquid crystal layer LC vary arrangement in response to an electric field formed between the common electrode 127 and the pixel electrodes PE1, PE2 and PE3, and thus a light transmittance of the liquid crystal layer LC is changed, thereby displaying an image having a predetermined gray-scale.

In FIGS. 4 and 5, the liquid crystal layer LC has a vertical alignment (VA) mode. In the VA mode, when the liquid crystal layer LC between the pixel electrodes PE1, PE2 and PE3 and the common electrode 127 is equipotential, the liquid crystals are vertically aligned. The liquid crystals of the liquid crystal layer LC surround the protruded patterns 125. In addition, the pixel electrodes PE1, PE2 and PE3 have the sub electrodes. Thus, the liquid crystals are divided into a plurality of domains so that a viewing angle is increased.

Figure 6A:
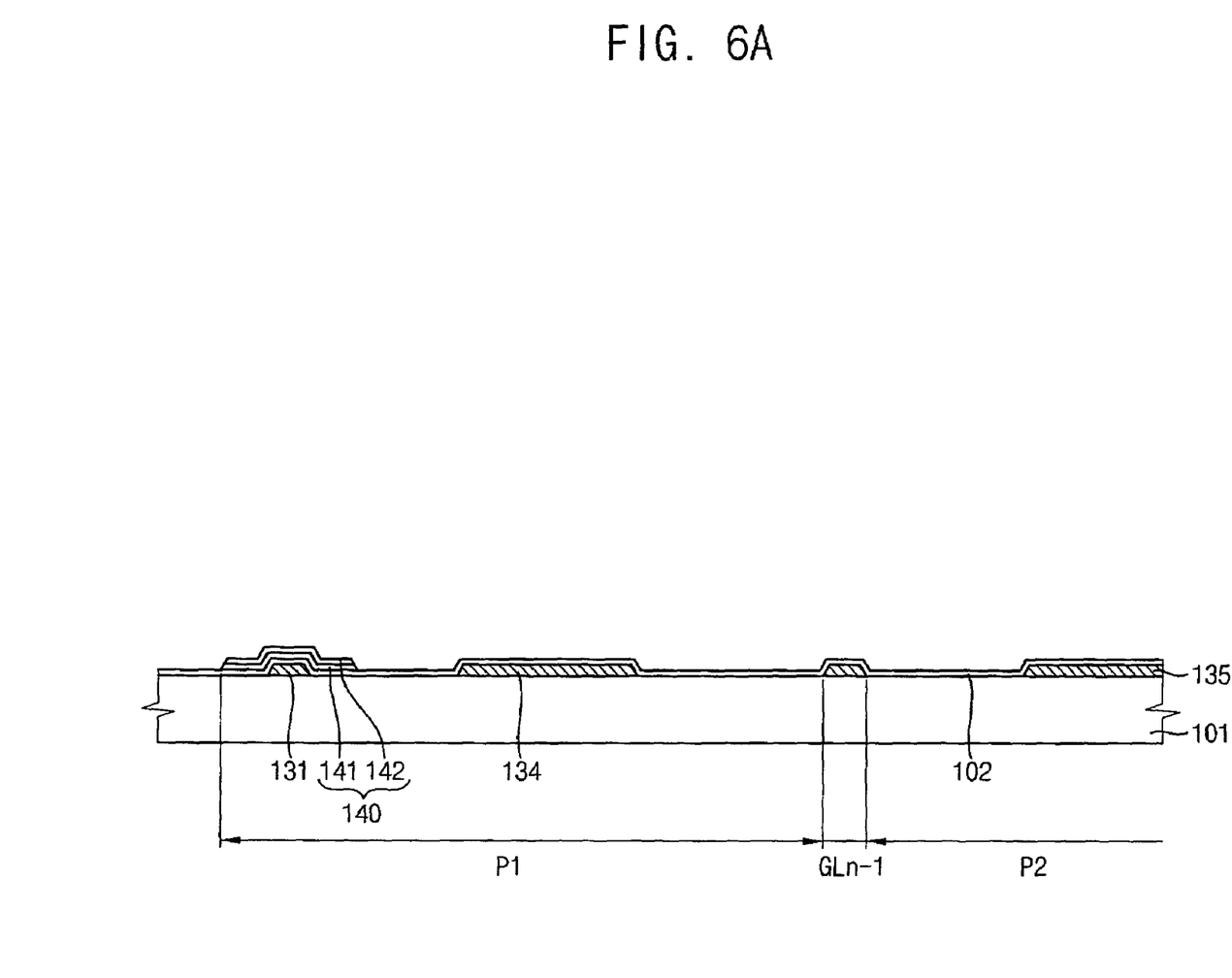
FIGS. 6A, 7A and 8A are cross-sectional views illustrating a method of manufacturing a display substrate shown in FIG. 5.
Figure 6B:
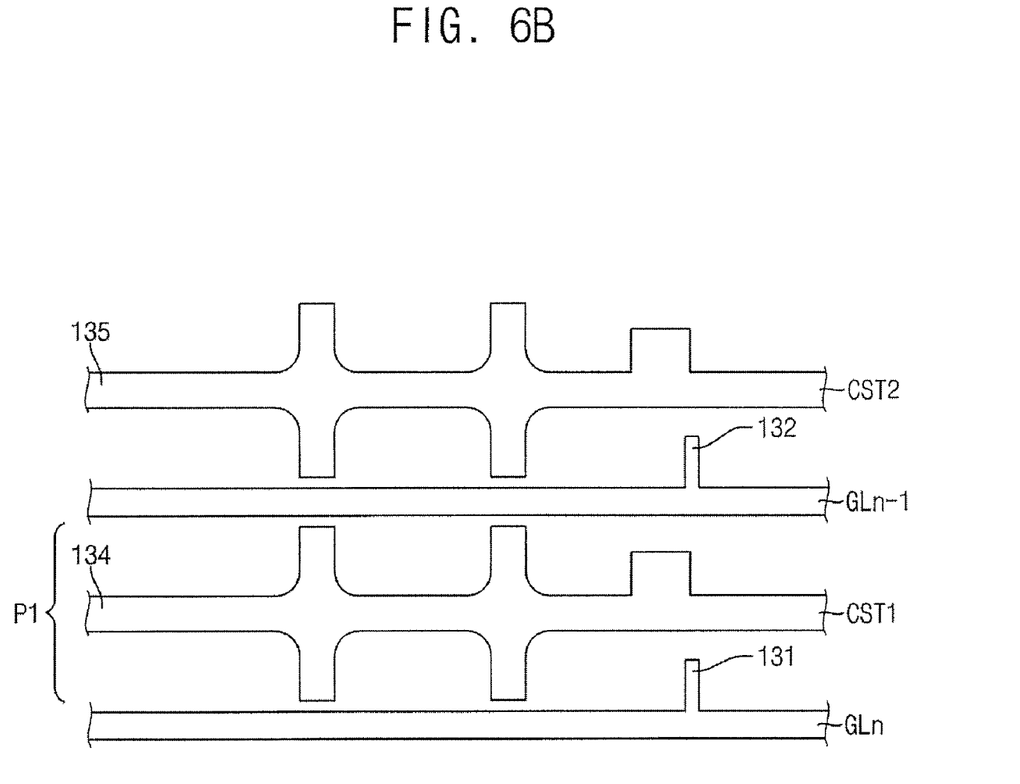
FIGS. 6B, 7B and 8B are plan views illustrating the method of manufacturing the display substrate shown in FIG. 5.
Figure 7A:
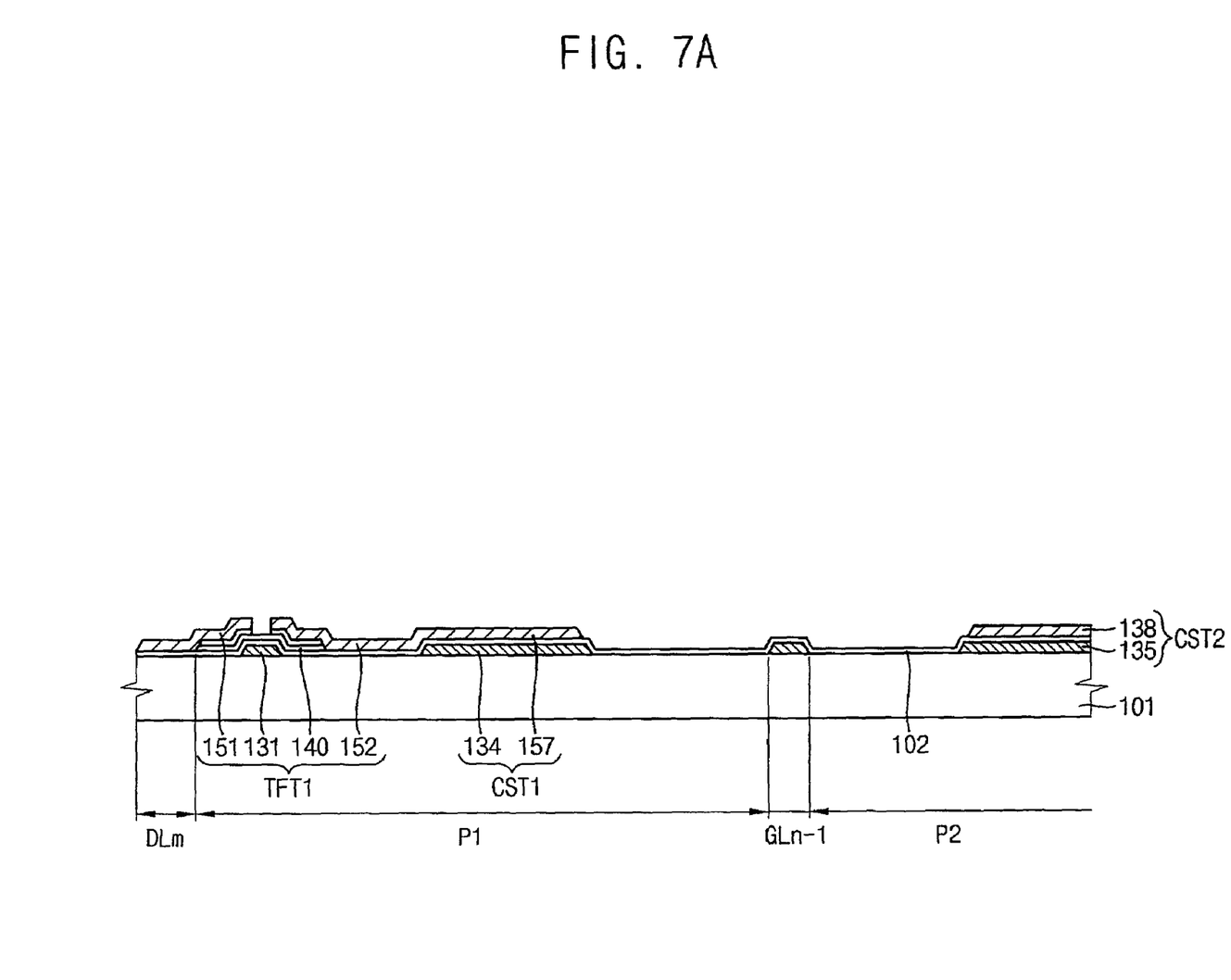
Figure 7B:
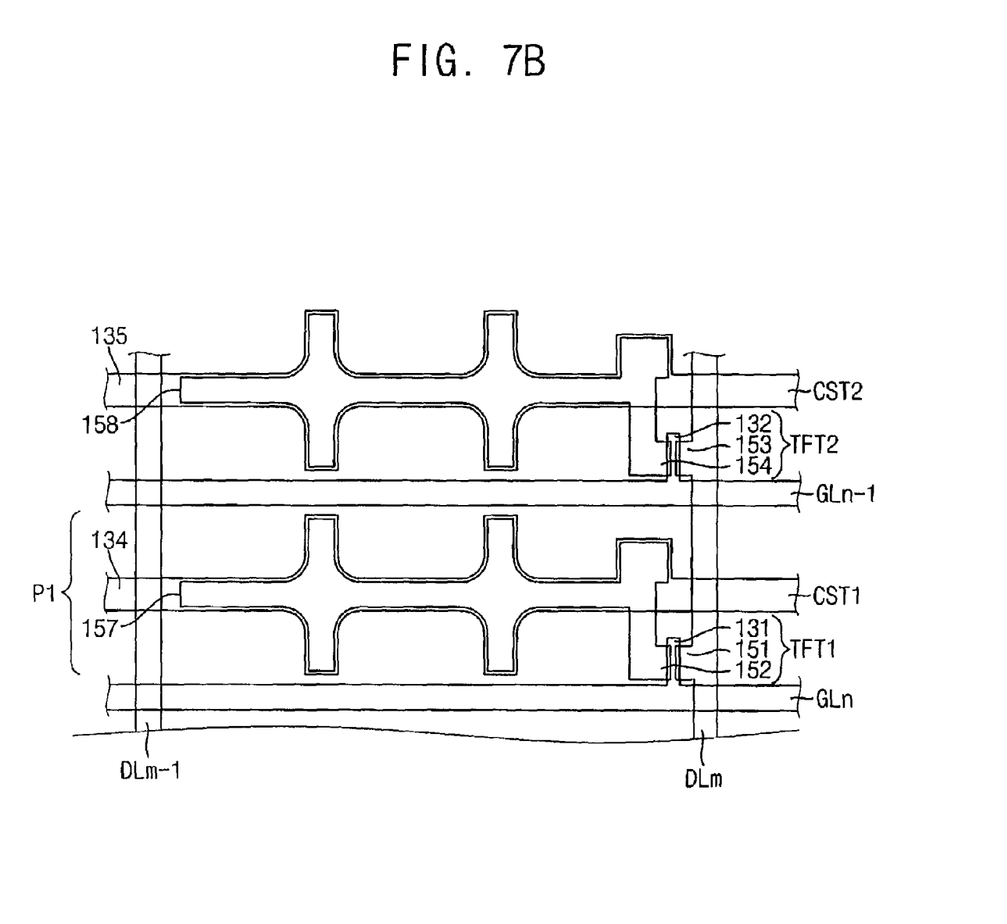
Figure 8A:
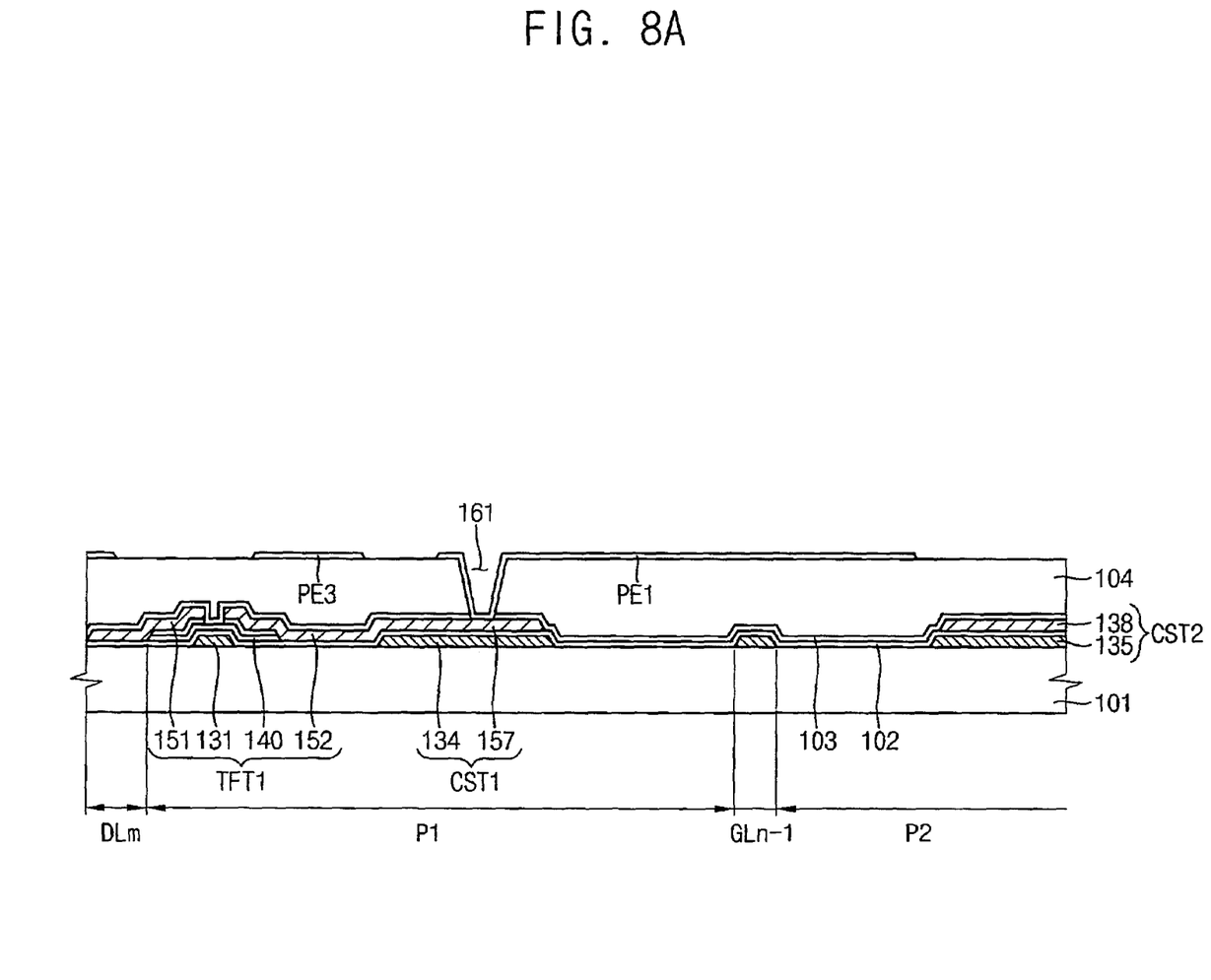
Figure 8B:
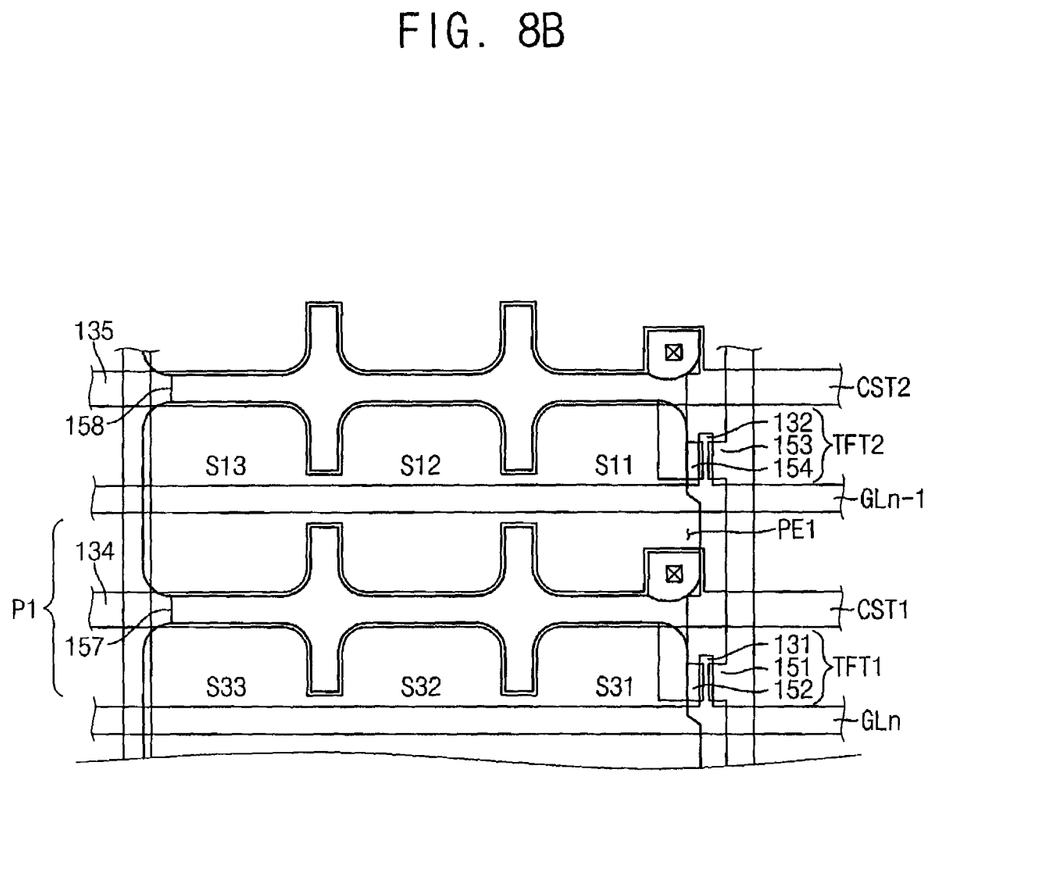

FIGS. 6A, 7A and 8A are cross-sectional views illustrating a method of manufacturing a display substrate shown in FIG. 5. FIGS. 6B, 7B and 8B are plan views illustrating the method of manufacturing the display substrate shown in FIG. 5.

Referring to FIGS. 4, 6A and 6B, a gate metal layer is deposited on the first base substrate 101. The gate metal layer is patterned to form a plurality of gate metal patterns. The gate metal patterns include a plurality of gate lines GLn−1, . . . GLn+1, a plurality of gate electrodes 131, 132 and 133 of a plurality of switching elements TFT1, TFT2 and TFT3 and a plurality of common lines 134, 135 and 136 of a plurality of storage capacitors CST1, CST2 and CST3.

Particularly, a first common line 134 of a first storage capacitor CST1 is formed on a first pixel part P1 that is defined by an (n−1)-th gate line and an n-th gate line GLn. The first common line 134 of the first storage capacitor CST1 is extended in a direction substantially in parallel with the gate lines GLn−1, . . . GLn+1. The first common line 134 is formed between first and third pixel electrodes PE1 and PE3 corresponding to the first pixel part P1, and between the sub electrodes of the first and third pixel electrodes PE1 and PE3. Thus, the first common line 134 blocks light incident into a space between the first and third pixel electrodes PE1 and PE3 corresponding to the first pixel part P1, and between the sub electrodes of the first and third pixel electrodes PE1 and PE3.

A gate insulating layer 102 is formed on the first base substrate 101 having the gate metal patterns. The gate insulating layer 102 includes an insulating material. Examples of the insulating material that can be used for the gate insulating layer 102 include silicon nitride, silicon oxide, etc. For example, a thickness of the gate insulating layer 102 may be about 4,500 Å.

A semiconductor layer 140 is formed on the gate insulating layer 102.

An amorphous silicon layer 141 and an N+ amorphous silicon layer 142 may be formed on the gate insulating layer 102, in sequence. For example, an amorphous silicon thin film is deposited on the gate insulating layer 102, and N+ impurities are implanted on an upper portion of the amorphous silicon thin film to form the N+ amorphous silicon layer 142 on the amorphous silicon layer 141. The amorphous silicon layer 141 and the N+ amorphous silicon layer 142 are patterned to form the semiconductor layer 140 on the first gate electrode 131.

Referring to FIGS. 4, 7A and 7B, a source metal layer is formed on the first base substrate 101 having the semiconductor layer 140. The source metal layer is patterned to form a plurality of source metal patterns.

The source metal patterns include a plurality of source lines DLm−1 and DLm, a plurality of source electrodes 151, 153 and 156, a plurality of drain electrodes 152, 154 and 156 and a plurality of metal electrodes of the storage capacitors CST1, CST2 and CST3.

Particularly, a first metal electrode 157 of the first storage capacitor CST1 is overlapped with the first common line. That is, the first metal electrode 157 is formed between the first and third pixel electrodes PE1 and PE3 corresponding to the first pixel part P1, and between the sub electrodes of the first and third pixel electrodes PE1 and PE3. Thus, the first metal electrode 157, the first common line 134 and the gate insulating layer 102 form the first storage capacitor CST1. The first storage capacitor CST1 blocks the light incident into the space between the first and third pixel electrodes PE1 and PE3 corresponding to the first pixel part P1, and between the sub electrodes of the first and third pixel electrodes PE1 and PE3.

Referring to FIGS. 4, 8A and 8B, a passivation layer 103 is formed on the first base substrate 101 having the source metal patterns. The passivation layer 103 includes an insulating material. Examples of the insulating material that can be used for the passivation layer 103 include silicon nitride, silicon oxide, etc. For example, a thickness of the passivation layer 103 is no more than about 4,000 Å.

An organic photoresist layer may be coated on the passivation layer 103 at a thickness of about 2 μm to about 4 μm through a spin coating method to form an organic insulating layer 104.

A plurality of contact holes through which the drain electrodes are partially exposed is formed in the passivation layer 103 and the organic insulating layer 104 through a photolithography process. In particular, the contact holes include a first contact hole 161, a second contact hole 162 and a third contact hole 163. A first metal electrode that is extended from a first drain electrode 152 of the first switching element TFT1 is partially exposed through the first contact hole 161. A second metal electrode that is extended from a second drain electrode 154 of the second switching element TFT2 is partially exposed through the second contact hole 162. A third metal electrode that is extended from a third drain electrode 156 of the third switching element TFT3 is partially exposed through the third contact hole 163.

The first, second and third contact holes 161, 162 and 163 are formed on peripheral portions of the first, second and third pixel parts P1, P2 and P3, respectively. An electric field may not be controlled on the peripheral portions of the first, second and third pixel parts P1, P2 and P3. In particular, the first contact hole 161 is adjacent to an m-th source line DLm that defines the first pixel part P1, and is on an upper portion of the first switching element TFT1.

A transparent conductive layer is formed on the first base substrate 101 having the first, second and third contact holes 161, 162 and 163. The transparent conductive layer is patterned to form a plurality of transparent electrode patterns. The transparent conductive layer includes a transparent conductive material. Examples of the transparent conductive material that can be used for the transparent conductive layer include indium tin oxide (ITO), indium zinc oxide (IZO), indium tin zinc oxide (ITZO), etc. These can be used alone or in a combination thereof.

The transparent electrode patterns include a first pixel electrode PE1, a second pixel electrode PE2 and a third pixel electrode PE3. The first, second and third pixel electrodes PE1, PE2 and PE3 are electrically connected to the first, second and third switching elements TFT1, TFT2 and TFT3 through the first, second and third contact holes 161, 162 and 163, respectively.

Particularly, the first pixel electrode PE1 is electrically connected to the first drain electrode 152 through the first contact hole 161, and is on the first and second pixel parts P1 and P2. In addition, the first pixel electrode PE1 is partially overlapped with the (m−1)-th source line DLm−1, and the organic insulating layer 104 is interposed between the first pixel electrode PE1 and the (m−1)-th source line DLm−1. Thus, an opening ratio of the first pixel part P1 is increased.

The first pixel electrode PE1 includes a first sub electrode S11, a second sub electrode S12 and a third sub electrode S13. The first, second and third sub electrodes S11, S12 and S13 are electrically connected to each other. Thus, the liquid crystals of the liquid crystal layer LC is divided by the electric field formed between the first, second and third sub electrodes S11, S12 and S13 and the common electrode 127 of the opposite substrate 120, thereby increasing the viewing angle.

According to the present invention, the storage capacitor is formed between the pixel electrodes so that a portion of the black matrix between the pixel electrodes may be omitted. In addition, the storage capacitor may also be formed between the sub electrodes of the pixel electrode. Thus, the opening ratio of the pixel electrode is increased.

Furthermore, the contact hole through which the switching element is electrically connected to the pixel electrode is formed on the peripheral portion of the pixel electrode, on which the electric field is incontrollable, so that the opening ratio of the pixel electrode is increased.

This invention has been described with reference to the example embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A display substrate comprising:
    a first pixel part including a first switching element electrically connected to an n-th gate line and an m-th source line;
    a second pixel part including a second switching element electrically connected to an (n−1)-th gate line and the m-th source line, the second pixel part being adjacent to the first pixel part;
    a third pixel part including a third switching element electrically connected to an (n+1)-th gate line and the m-th source line, the third pixel part being adjacent to the first pixel part;
    a first pixel electrode electrically connected to the first switching element, the first pixel electrode being formed on the first and second pixel part;
    a second pixel electrode electrically connected to the second switching element, the second pixel electrode being formed on a portion of the second pixel part; and
    a third pixel electrode electrically connected to the third switching element, the third pixel electrode being formed on the first and third pixel parts,
    wherein a first storage capacitor electrically connected to the first pixel electrode, a second storage capacitor electrically connected to the second pixel electrode, and a third storage capacitor electrically connected to the third pixel electrode are formed on the first, second, and third pixel parts, respectively,
    wherein the first storage capacitor is formed between the first and third pixel electrodes, the second storage capacitor is formed between the first and second pixel electrodes, and
    the third storage capacitor is formed between the third pixel electrode and a fourth pixel electrode that is adjacent to the second pixel electrode,
    wherein the first storage capacitor is not overlapped with the first and third pixel electrodes except a portion where a first contact part is formed therethrough, the second storage capacitor is not overlapped with the first and second pixel electrodes except a portion where a second contact part is formed therethrough, and a third storage capacitor is not overlapped with the third and fourth pixel electrodes except a portion where a third contact part is formed therethrough.

2. The display substrate of claim 1, wherein each of the first, second and third pixel electrodes comprise a plurality of sub electrodes.

3. The display substrate of claim 2, wherein the first, second and third storage capacitors are extended into a space between the sub electrodes of the first pixel electrode, a space between the sub electrodes of the second pixel electrode, and a space between the sub electrodes of the third pixel electrode.

4. The display substrate of claim 1, further comprising an organic insulating layer formed between the first, second and third switching elements and the first, second and third pixel electrodes.

5. The display substrate of claim 4, wherein end portions of the first, second and third pixel electrodes are partially overlapped with the source lines.

6. The display substrate of claim 5, wherein each of the first, second and third storage capacitor comprises: a common line formed from a substantially same metal layer as the gate lines; and a metal electrode formed from a substantially same metal layer as the source lines.

7. The display substrate of claim 1
    wherein the first switching element is electrically connected to the first pixel electrode through the first contact part;
    wherein the second switching element is electrically connected to the second pixel electrode through the second contact part; and
    wherein the third switching element is electrically connected to the third pixel electrode through the third contact part.

8. The display substrate of claim 7, wherein the first, second and third contact parts are formed on peripheral portions of the first, second and third pixel parts, respectively.

9. A liquid crystal display panel comprising:
    a display substrate including:
    a first pixel part including a first switching element electrically connected to an n-th gate line and an m-th source line;
    a second pixel part including a second switching element electrically connected to an (n−1)-th gate line and the m-th source line;
    a third pixel part including a third switching element electrically connected to an (n+1)-th gate line and the m-th source line;
    a first pixel electrode electrically connected to the first switching element, the first pixel electrode being formed on the first and second pixel part;
    a second pixel electrode electrically connected to the second switching element, the second pixel electrode being formed on a portion of the second pixel part; and
    a third pixel electrode electrically connected to the third switching element, the third pixel electrode being formed on the first and third pixel parts; and
    an opposite substrate combined with the display substrate to interpose a liquid crystal layer, the opposite substrate including a black matrix corresponding to the source lines,
    wherein a first storage capacitor extended in a direction substantially in parallel with the gate lines and being electrically connected to the first pixel electrode, a second storage capacitor extended in the direction substantially in parallel with the gate lines and being electrically connected to the second pixel electrode, and a third storage capacitor extended in the direction substantially in parallel with the gate lines and being electrically connected to the third pixel electrode are formed on the first, second and third pixel parts, respectively,
    wherein the first storage capacitor is formed between the first and third pixel electrodes, the second storage capacitor is formed between the first and second pixel electrodes, and
    the third storage capacitor is formed between the second pixel electrode and a fourth pixel electrode that is adjacent to the second pixel electrode, wherein the first storage capacitor is not overlapped with the first and third pixel electrodes except a portion where a first contact part is formed therethrough, the second storage capacitor is not overlapped with the first and second pixel electrodes except a portion where a second contact part is formed therethrough, and a third storage capacitor is not overlapped with the third and fourth pixel electrodes except a portion where a third contact part is formed therethrough.

10. The liquid crystal display panel of claim 9, wherein the opposite substrate further comprises a first color filter pattern corresponding to the first pixel electrode, a second color filter pattern corresponding to the second pixel electrode, a third color filter pattern corresponding to the third pixel electrode, and a fourth color filter pattern adjacent to the third color filter pattern, the first storage capacitor is interposed between the first and third color filter patterns, the second storage capacitor is interposed between the first and second color filter patterns, and the third storage capacitor is interposed between the third and fourth color filter pattern.

11. The liquid crystal display panel of claim 9, wherein each of the first, second and third pixel electrodes comprises a plurality of sub electrodes, and the opposite substrate further comprises a plurality of protruded patterns corresponding to the sub electrodes, respectively.

12. The liquid crystal display panel of claim 11, wherein the first, second and third storage capacitors are extended into a space between the sub electrodes of the first pixel electrode, a space between the sub electrodes of the second pixel electrode, and a space between the sub electrodes of the third pixel electrode.

13. The liquid crystal display panel of claim 9, wherein the first switching element is electrically connected to the first pixel electrode, the first contact part being on a peripheral portion of the first pixel part through the first contact part;

wherein the second switching element is electrically connected to the second pixel electrode, the second contact part being on a peripheral portion of the second pixel part through the second contact part; and wherein the third switching element is electrically connected to the third pixel electrode, the third contact part being on a peripheral portion of the third pixel part through the third contact part.

14. The liquid crystal display panel of claim 9, wherein the display substrate further comprises an organic insulating layer interposed between the first, second and third switching elements and the first, second and third pixel electrodes.

15. A liquid crystal display device comprising:
a liquid crystal display panel including:
a first pixel part including a first switching element electrically connected to an n-th gate line and an m-th source line;
a second pixel part including a second switching element electrically connected to an (n−1)-th gate line and the m-th source line;
a third pixel part including a third switching element electrically connected to an (n+1)-th gate line and the m-th source line;
a first pixel electrode electrically connected to the first switching element, the first pixel electrode being formed on the first and second pixel part;
a second pixel electrode electrically connected to the second switching element, the second pixel electrode being formed on a portion of the second pixel part; and
a third pixel electrode electrically connected to the third switching element, the third pixel electrode being formed on the first and third pixel parts; and
a light source module supplying the liquid crystal display panel with light, wherein a first storage capacitor electrically connected to the first pixel electrode, a second storage capacitor electrically connected to the second pixel electrode and a third storage capacitor electrically connected to the third pixel electrode are formed on the first, second and third pixel parts, respectively, wherein the first storage capacitor is formed between the first and third pixel electrodes, the second storage capacitor is formed between the first and second pixel electrodes, and the third storage capacitor is formed between the second pixel electrode and a fourth pixel electrode that is adjacent to the second pixel electrode, wherein the first storage capacitor is not overlapped with the first and third pixel electrodes except a portion where a first contact part is formed therethrough, the second storage capacitor is not overlapped with the first and second pixel electrodes except a portion where a second contact part is formed therethrough, and a third storage capacitor is not overlapped with the third and fourth pixel electrodes except a portion where a third contact part is formed therethrough.

16. The liquid crystal display device of claim 15, wherein the first storage capacitor blocks light incident into a space between the first and third pixel electrodes, the second storage capacitor blocks light incident into a space between the first and second pixel electrodes, and the third storage capacitor blocks light incident into a space between the third pixel electrode and a fourth pixel electrode that is adjacent to the third pixel electrode.

17. The liquid crystal display device of claim 15, wherein each of the first, second and third pixel electrodes comprises a plurality of sub electrodes.

18. The liquid crystal display device of claim 17, wherein the first storage capacitor blocks light incident into a space between the sub electrodes of the first and third pixel electrodes, the second storage capacitor blocks light incident into a space between the sub electrodes of the first and second pixel electrodes, and the third storage capacitor blocks light incident into a space between the sub electrodes of the first and fourth pixel electrodes.

19. A liquid crystal color display having a plurality of pixels, pixel electrodes and thin film transistors for driving said pixels, an improvement comprising:

at each of said pixels including a respective pixel part, pixel electrode and thin film transistor for each of said colors;

a first of said pixel electrodes being formed partially on a first and on a second of said pixel parts;

a second of said pixel electrodes being formed partially on said second pixel part and on a third of said pixel parts; and a third pixel electrode being formed partially on said third pixel part and an adjoining one of said pixel parts, wherein a first storage capacitor electrically connected to the first pixel electrode, a second storage capacitor electrically connected to the second pixel electrode, and a third storage capacitor electrically connected to the third pixel electrode are formed on the first, second, and third pixel parts, respectively, wherein the first storage capacitor is formed between the first and third pixel electrodes, the second storage capacitor is formed between the first and second pixel electrodes, and the third storage capacitor is formed between the second pixel electrode and a fourth pixel electrode that is adjacent to the second pixel electrode, wherein the first storage capacitor is not overlapped with the first and third pixel electrodes except a portion where a first contact part is formed therethrough, the second storage capacitor is not overlapped with the first and second pixel electrodes except a portion where a second contact part is formed therethrough, and a third storage capacitor is not overlapped with the third and fourth pixel electrodes except a portion where a third contact part is formed therethrough.

* * * * *